(12) United States Patent
Korenstein et al.

(10) Patent No.: US 7,790,072 B2
(45) Date of Patent: Sep. 7, 2010

(54) TREATMENT METHOD FOR OPTICALLY TRANSMISSIVE BODIES

(75) Inventors: Ralph Korenstein, Framingham, MA (US); Patrick K. Hogan, Andover, MA (US); John S. McCloy, Tucson, AZ (US); Charles B. Willingham, Framingham, MA (US)

(73) Assignee: Raytheon Company, Waltham, MA (US)

(*) Notice: Subject to any disclaimer, the term of this patent is extended or adjusted under 35 U.S.C. 154(b) by 153 days.

(21) Appl. No.: 11/958,549

(22) Filed: Dec. 18, 2007

(65) Prior Publication Data

US 2009/0155162 A1    Jun. 18, 2009

(51) Int. Cl.
    *B29D 11/00* (2006.01)
(52) U.S. Cl. ..................................... 264/2.6; 264/2.7
(58) Field of Classification Search ................. 264/1.21; 423/566.1
    See application file for complete search history.

(56) References Cited

U.S. PATENT DOCUMENTS 3,131,025 A    4/1964    Carnall, Jr. et al.

(Continued)

FOREIGN PATENT DOCUMENTS

EP    0935012    8/1999

(Continued)

OTHER PUBLICATIONS

Harris, Daniel C., "Development of Hot-Pressed and Chemical-Vapor-Deposited Zinc Sulfide and Zinc Selenide in the United States for Optical Windows", (2007), Proceedings of SPIE, XP002515445, vol. 6545, No. 1, pp. 654502-1-654502-27.

(Continued)

*Primary Examiner*—Kat Wyrozebski
*Assistant Examiner*—Robert J Grun
(74) *Attorney, Agent, or Firm*—Renner, Otto, Boisselle & Sklar, LLP

(57) ABSTRACT

A method of treating zinc sulfide transmissive bodies includes using the same metal layer to treat multiple transmissive bodies, catalyzing the recrystallization of the bodies to remove defects from the bodies and forming multispectral zinc sulfide. The metal layer is brought into contact with one of the transmissive bodies. The transmissive body and the metal layer are then subjected to elevated temperature and pressure. The metal layer may include any of a variety of suitable metals, such as platinum, cobalt, silver, nickel, and/or copper. The metal layer may be a foil that is wrapped around the transmissive body. Alternatively the metal layer may be a rigid metal piece, for example being machined to fit the shape of the transmissive bodies. The reuse of the metal layer to treat multiple transmissive bodies reduces the cost of treating the transmissive bodies.

17 Claims, 1 Drawing Sheet

U.S. PATENT DOCUMENTS

| | | | |
|---|---|---|---|
| 3,131,026 A | 4/1964 | Carnall, Jr. et al. | |
| 3,131,238 A | 4/1964 | Carnall, Jr. et al. | |
| 3,362,795 A | 1/1968 | Welsbeck | |
| 4,303,635 A | 12/1981 | Aldinger et al. | |
| 4,944,900 A * | 7/1990 | Willingham et al. | 264/1.21 |
| 5,122,424 A | 6/1992 | Chaffin, III | |
| 5,126,081 A | 6/1992 | Willingham et al. | |
| 5,281,465 A | 1/1994 | Wahl et al. | |
| 5,324,353 A | 6/1994 | Wahl et al. | |
| 5,575,959 A | 11/1996 | Harris et al. | |
| 5,643,505 A | 7/1997 | Harris et al. | |
| 6,045,728 A | 4/2000 | Chen et al. | |
| 6,083,561 A | 7/2000 | Goela et al. | |
| 6,111,689 A | 8/2000 | Shibata | |
| 6,221,482 B1 | 4/2001 | Goela | |
| 2001/0016184 A1 * | 8/2001 | Campbell et al. | 423/244.06 |

FOREIGN PATENT DOCUMENTS

| | | |
|---|---|---|
| EP | 1043289 | 10/2000 |
| GB | 2125023 | 2/1984 |
| JP | 57011824 | 1/1982 |

OTHER PUBLICATIONS

International Search Report and Written Opinion from corresponding International Application No. PCT/US08/78691.

U.S. Appl. No. 11/771,181, filed Jun. 29, 2007.

* cited by examiner

TREATMENT METHOD FOR OPTICALLY TRANSMISSIVE BODIES

BACKGROUND OF THE INVENTION

1. Technical Field of the Invention

This invention relates generally to optical elements and methods for treating optical elements.

2. Description of the Related Art

As is known, some optical imaging systems include one or more externally mounted optical elements that shield the remainder of the imaging system from an external environment. For example, with infrared (IR) airborne imaging systems, an IR transparent optical element, such as a window or dome, may be part of the airborne system, used to isolate the remainder of the imaging system from exposure to humid, corrosive, and abrasive environments. Such elements often find applications on missiles, for example as part of a radar dome for a missile.

Zinc sulfide has been used in the past as a material for such domes. These materials are capable of providing a degree of mechanical durability and of providing reasonable optical performance in the long infrared imaging wavelength band of approximately 8-12 microns.

Chemically-vapor-deposited zinc sulfide has been treated in order to improve optical properties of the material for visible and near-infrared wavelengths, for example by changing the chemically-vapor-deposited zinc sulfide to multispectral zinc sulfide. One way of doing so has been to bring platinum into contact with the zinc sulfide or zinc selenide, and then heat the combination under pressure in a hot isostatic pressure (HIP) treatment. Such a treatment is described in U.S. Pat. No. 4,944,900.

However platinum is an expensive material, making the treatment costly. There is thus room for improvement with regard to such optical materials and their treatment.

SUMMARY OF THE INVENTION

According to an aspect of the invention, the same metal layer is used to successively treat multiple zinc sulfide bodies to improve optical properties of the bodies.

According to another aspect of the invention, a method of treating multiple zinc sulfide transmissive bodies includes successively individually treating the transmissive bodies using a single metal layer by: bringing the metal layer into contact with one of the transmissive bodies; improving optical properties of the transmissive body by heating the metal layer and the transmissive body, wherein the heating is performed at an elevated temperature above normal ambient temperature and at an elevated pressure above normal ambient pressure; and separating the metal layer and the transmissive body.

According to yet another aspect of the invention, a method of treating zinc sulfide transmissive bodies includes the steps of: bringing a first zinc sulfide transmissive body into contact with a metal layer; improving optical properties of the first transmissive body by heating the metal layer and the first transmissive body, wherein the heating is performed at an elevated temperature above normal ambient temperature and at an elevated pressure above normal ambient pressure; separating the metal layer from the first transmissive layer; bringing a second zinc sulfide transmissive body into contact with the metal layer; and improving optical properties of the second transmissive body by heating the metal layer and the second transmissive body, wherein the heating is performed above the normal ambient temperature and above the normal ambient pressure.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A method of treating zinc sulfide transmissive bodies includes using the same metal layer to treat multiple transmissive bodies, removing impurities from the bodies and forming multispectral zinc sulfide. The metal layer is brought into contact with one of the transmissive bodies. The transmissive body and the metal layer are then subjected to elevated temperature and pressure. It is believed that this causes the reaction between the metal and sulfur as the ZnS begins to sublime at high temperatures. The reaction of the metal with sulfur producing metal sulfide releases energy which nucleates the recrystallization of the ZnS at faster rates and lower temperatures than otherwise. This recrystallization removes defects and stacking faults which scatter light. Of particular interest may be wavelengths of about 1064 nm or 1 micron, which are wavelengths that are utilized by semiactive laser (SAL) seekers. Transmission at this wavelength as been found to closely correlate with transmission throughout the visible and NIR wavelengths. The metal layer may include any of a variety of suitable metals, such as platinum, silver, nickel, and/or copper. The metal layer may be a foil that is wrapped around the transmissive body. Alternatively the metal layer may be a rigid metal piece, for example being machined to fit the shape of the transmissive bodies. The reuse of the metal layer to treat multiple transmissive bodies reduces the cost of treating the transmissive bodies.

Figure 1:
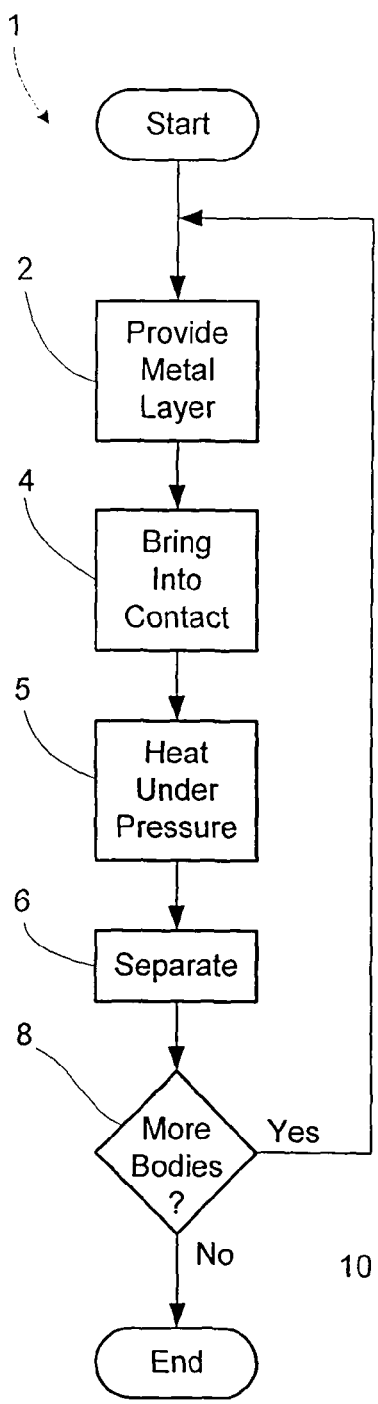
FIG. 1 is a high-level flow chart of a method in accordance with an embodiment of the present invention.

FIG. 1 shows the broad outline of a method 1 for treating multiple zinc sulfide transmissive bodies using a metal layer. A brief description of the steps of the process is given here, with more detail regarding some of the steps given below.

In step 2 the metal layer is formed or provided. As described in greater detail below, the metal layer may be a metal foil or may be a rigid metal part that may be machined to fit with the transmissive bodies.

In step 4 the metal layer is brought into contact with one of the transmissive bodies. For a metal foil, this may be done by wrapping the transmissive body in the foil. For a rigid metal part, the bringing into contact may be done by pressing or clamping the metal part and the transmissive body together.

The metal layer and the transmissive body are heated under elevated pressure in step 5. The process may be a hot isostatic pressure (HIP) process that involves simultaneous application of heat and pressure through use of an inert working fluid. The treatment process in step 5 is believed to improve the optical properties of the transmissive body by catalyzing the recrystallization of the ZnS. The sulfur removed may be chemically bonded to the metal layer in contact with the transmissive body. The reduction of stacking faults and non-equilibrium grain boundaries in the transmissive body portion may improve optical properties for visible and near infrared (NIR) wavelengths. Of particular interest may be wavelengths of about 1064 nm or 1 micron, which are wavelengths that are utilized by semi-active laser (SAL) seekers. Transmission at this wavelength as been found to closely correlate with transmission throughout the visible and NIR wavelengths.

Following the HIP treatment, the metal layer and the transmissive body are separated in step 6. Then in step 8, if more transmissive bodies require treatment, the process reverts to step 4, with the same metal layer being brought into contact with another zinc sulfide transmissive body. The same metal layer may be used to catalyze the recrystallization and/or otherwise improve optical properties of multiple zinc sulfide transmissive bodies. The use of the same metal layer to treat multiple transmissive bodies reduces costs and the amount of metal used. The same metal layer may be used to treat at least five transmissive bodies, or (for thicker metal layers) as many as one hundred or more transmissive bodies. As an example, because platinum sulfide dissociates at elevated temperature, releasing sulfur and reducing to platinum, repeated use at elevated temperatures will not use up the platinum. It is possible that the elevated pressures will reduce the rate of thermal dissociation of platinum sulfide, but it is known that heating the platinum with platinum sulfide layer at high temperatures in nitrogen or other inert atmosphere will recover the platinum. Such heating may include heating to a temperature of from 900 to 1100 degrees C. In this way the platinum metal layer can be re-used, and theoretically may be used indefinitely.

Figure 2:
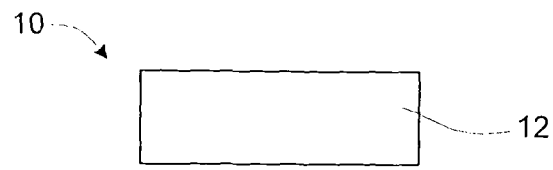
FIG. 2 is a cross-sectional view of an optical device of transmissive material, prior to treatment.

Referring now to FIG. 2, an optical device 10 or an optical element includes a zinc sulfide transmissive body portion 12 that theoretically has transparency in the infrared and visible portions of the electromagnetic spectrum. The material of the transmissive body portion 12 may be a chemically-vapor-deposited zinc sulfide, formed by a chemical vapor deposition process. The optical device may be a curved dome of transmissive material, such as used in an imaging system.

Figure 3:
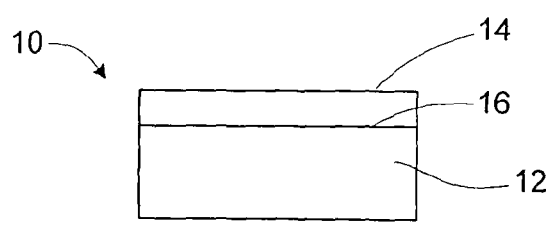
FIG. 3 is a cross-sectional view of the transmissive body of FIG. 2, with a metal layer on a surface of the body, in accordance with an embodiment of the invention.

FIG. 3 shows the transmissive body portion 12 with a metal layer 14 placed in contact with a surface 16 of the transmissive body portion 12. Although the metal layer 14 is shown only on one side of the body portion 12, it will be appreciated that the metal layer 14 will in general be in contact with both sides (major surfaces) of the body portion 12. The metal layer 14 may be a metal foil. The metal foil may have a thickness on the order of 0.03 mm, although it will be appreciated that other thicknesses may be used. The metal foil may be held against the transmissive body surface, for example by use of weights to press the metal foil against the surface 16.

The metal layer 14 may also be at least part of a rigid metal piece. A rigid piece of metal may be shaped to fit the surface 16 of the transmissive body 12, for example by machining. The rigid metal piece may have the advantage of being able to easily fit the shape of transmissive bodies, without any need for adjustment or pressure to conform to the surface 16. The rigid metal piece may have sufficient thickness to allow reuse a large number of times with different transmissive bodies, catalyzing the recrystallization of the ZnS.

The metal of the metal layer 14 may be any of a variety of suitable metals, for example including one or more of platinum, silver, nickel, and copper. Other metals may also be suitable for use in the metal layer 14. Characteristics of other suitable metals are described at length in commonly-assigned U.S. patent application Ser. No. 11/771,181, filed Jun. 29, 2007, the description of which is herein incorporated by reference.

Figure 4:
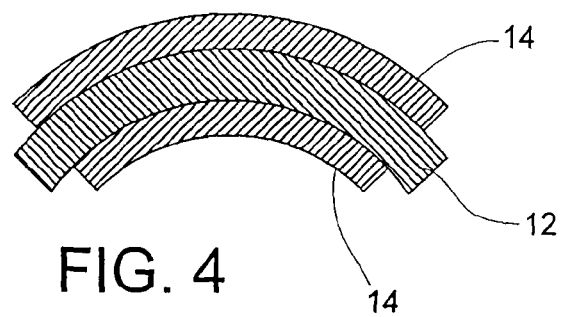
FIG. 4 is a cross-sectional view showing one possible shape for the transmissive body and the metal layers.

FIG. 4 shows one example of the possible shapes of the metal layer 14 and the transmissive body 12. In FIG. 4 a dome-shaped transmissive body 12 is engaged by a pair of dome-shaped metal layers 14. It will be appreciated that many other shapes are possible.

Figure 5:
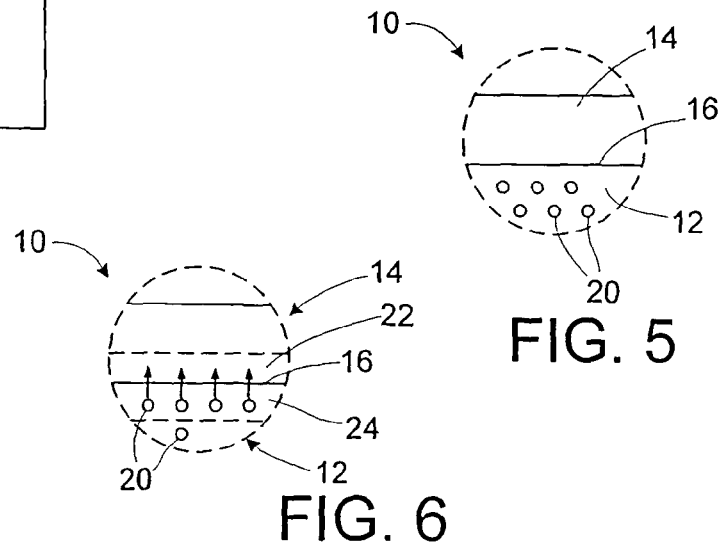
FIG. 5 is a detailed view of portions of the body and the layer of FIG. 3.
Figure 6:
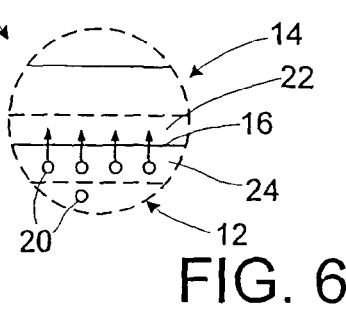
FIG. 6 is a view of the same portion as FIG. 5, illustrating changes in a hot isostatic pressure (HIP) process to improve optical characteristics of the transmissive body.

With reference now to FIGS. 5 and 6, a hypothesized mechanism is explained for the optical improvement of the zinc sulfide transmissive material portion 12, initially having an amount of sulfur 20 within it. Upon heating under pressure some of the sulfur 20 diffuses and evaporates out of the zinc sulfide transmissive body 12 and reacts with the metal layer 14, as is illustrated in FIG. 5. In the layer 14 the sulfur 20 chemically bonds with the metal of the metal layer 14. This chemical bonding may occur at the surface 16, which is the interface between the transmissive material 12 and the metal layer 14. The chemical bonding between the sulfur and the metal may produce a metal sulfide region 22 in the layer 14. It is the removal of some of the sulfur 20 from the zinc sulfide transmissive material portion 12 and its subsequent reaction with the metal that is believed to provide the principal mechanism catalyzing recrystallization at lower temperatures and faster rates for improving the optical properties of the zinc sulfide transmissive material.

In addition there may be a region 24 in the transmissive material portion 12 into which the metal diffuses. It is possible that this diffusion of metal into the region 24 may adversely impact the optical properties of the transmissive material body 12. The diffusion of metal into the transmissive body material may degrade optical properties of the transmissive material, particularly at shorter wavelengths, such as 700 nm. It will be appreciated that the separable contact between the metal layer 14 (either rigid material or foil) may cause less migration of metal into the transmissive body portion 12 than more intimate contact between metal and transmissive body, such as that resulting from deposition of metal directly onto a transmissive body (such as by physical vapor deposition or chemical vapor deposition). The contact between a foil or rigid metal layer and a transmissive body may involve one or more gaps, which may inhibit diffusion of metal into the transmissive body. It is believed that for foils or rigid metal layers, chemical bonding between the metal and the free sulfur occurs when the sulfur first goes into the gas phase, and only then enters the metal.

Consistent with the above hypothesized mechanism, it would be desired for the metal to easily chemical bond with sulfur and in so doing result in an exothermic reaction. In addition the metal sulfide created should have a lower vapor pressure than zinc sulfide. A metal having these two characteristics at the process temperature will act as a sink for the sulfur, capturing some of the evaporating sulfur from the zinc sulfide transmissive material and catalyzing the recrystallization through heterogeneous nucleation at the surface.

It is desirable or required that the metal have a high melting temperature (certainly higher than the treatment temperature), a relatively low vapor pressure such that there is no appreciable material loss during heat treatment, and a low cost.

The process illustrated in FIGS. 5 and 6 is performed at an elevated pressure and an elevated temperature. The process may be a hot isostatic pressure (HIP) process that involves simultaneous application of heat and pressure through use of an inert working fluid. An elevated pressure of 5,000 to 30,000 psi (34.5 to 207 MPa) is suitable for the HIP process, although it will be appreciated that other suitable elevated pressures may be used. A broad range of pressure may be employed, such as from 2,000 to 80,000 psi (13.8 to 552 MPa). Performing the process at an elevated pressure improves consistency of the results and allows higher temperatures to be used which would otherwise fully evaporate the ZnS. The elevated pressure may reduce porosity of materials, although there may be different or additional mechanisms affected by the elevated pressure.

A suitable temperature range for the methods described herein is 700 to 1050 degrees C. Temperatures in the range of 750 to 900 degrees C. have been found suitable for processes involving platinum although it will be appreciated that higher temperature, such as 990 degrees C., may alternatively be used. Lower temperatures may result in mechanically stronger multispectral zinc sulfide, since grain growth is reduced by operating at a lower temperature.

Figure 7:
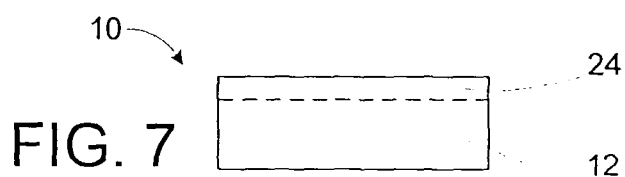
FIG. 7 is a cross-sectional view of the transmissive body after removal of the metal layer.

Turning now to FIG. 7, the metal layer 14 is removed after the HIP process is completed. Any compounds that are part of the layer 14 are removed along with the rest of the layer. The zinc sulfide transmissive material 12 may then be treated further, for example by polishing. It will be appreciated that the metal layer 14 may be reused without any action needed to reshape the metal.

The metal layer 14 may be reused until the material is exhausted, meaning that it no longer effectively catalyzes the recrystallization of zinc sulfide transmissive bodies. This may occur when the metal layer is, for practical purposes, effectively saturated with sulfur. This may occur when there is enough sulfur at the surface in contact with transmissive bodies so that there is no longer sufficiently rapid transfer of sulfur from transmissive bodies to the metal layer. It will be appreciated that continued use of the metal layer in elevated temperature processes may cause sulfur to migrate away from the contact surface of the metal layer, and into the bulk of the metal layer. In addition, the metal layer may be heated when not in contact with a transmissive body to encourage migration of sulfur and sulfur compounds away from the surface used to contact transmissive bodies.

The number of times that the metal layer 14 may be used and reused may be a strong function of the thickness of the metal layer 14. The metal foil may have a thickness of about 0.001 to 0.002 inches (0.025 to 0.05 mm), which may be usable to treat at least five zinc sulfide transmissive bodies. A thicker rigid body, having a thickness of about 0.2 inches (5 mm), may be used to treat at least 500 zinc sulfide transmissive bodies. The principle limitation in metal thickness of the rigid body is the handling and/or forming between uses. Metal which has substantially converted to the sulfide will no longer be ductile.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of treating multiple zinc sulfide transmissive bodies, the method comprising:
successively individually treating the transmissive bodies using a single metal layer by:
bringing the metal layer into contact with one of the transmissive bodies;
improving optical properties of the transmissive body by heating the metal layer and the transmissive body, wherein the heating is performed at an elevated temperature above normal ambient temperature and at an elevated pressure above normal ambient pressure; and
separating the metal layer and the transmissive body;
wherein the metal layer is a rigid metal layer; and
wherein the metal layer is a machined metal part with a surface configured to engage surfaces of the transmissive bodies.

2. The method of claim 1,
wherein the transmissive bodies are dome-shaped bodies; and
wherein the rigid metal layer has a dome-shaped surface.

3. The method of claim 1, wherein the metal layer includes one or more of platinum, cobalt, silver, iron, and copper.

4. The method of claim 1, wherein the metal layer includes platinum.

5. The method of claim 1, wherein the multiple transmissive bodies includes at least five transmissive bodies.

6. The method of claim 1, wherein the multiple transmissive bodies includes at least one hundred transmissive bodies.

7. The method of claim 1, wherein the metal layer has a thickness of at least 5 mm.

8. The method of claim 1, wherein the elevated temperature is a temperature from 750 degrees C. to 900 degrees C.

9. The method of claim 1, wherein the heating includes evaporating sulfur from the zinc sulfide.

10. The method of claim 9, wherein the removing includes chemically bonding the sulfur and metal of the metal layer.

11. The method of claim 10, wherein the chemically bonding includes chemically bonding at least in part within the metal layer.

12. The method of claim 1, wherein the transmissive bodies are dome-shaped bodies.

13. A method of treating zinc sulfide transmissive bodies, the method comprising:
bringing a first zinc sulfide transmissive body into contact with a metal layer;
improving optical properties of the first transmissive body by heating the metal layer and the first transmissive body, wherein the heating is performed at an elevated temperature above normal ambient temperature and at an elevated pressure above normal ambient pressure;

separating the metal layer from the first transmissive layer;

bringing a second zinc sulfide transmissive body into contact with the metal layer;

improving optical properties of the second transmissive body by heating the metal layer and the second transmissive body, wherein the heating is performed above the normal ambient temperature and above the normal ambient pressure; and between the separating and the improving the optical properties of the second transmissive body, heating the metal layer which has been partially converted to a metal sulfide, in an inert atmosphere, to thereby drive off sulfur from the metal layer;

wherein the metal layer is a rigid machined metal layer.

14. The method of claim 13, wherein the metal layer is a platinum layer.

15. The method of claim 13, wherein the inert atmosphere is a nitrogen atmosphere; and wherein the heating includes heating to a temperature of between 900 and 1100 degrees C.

16. A method of treating a zinc sulfide transmissive body, the method comprising:

bringing a dome-shaped surface of a rigid metal layer into contact with the transmissive body;

improving optical properties of the transmissive body by heating the rigid metal layer and the transmissive body, wherein the heating is performed at an elevated temperature above normal ambient temperature and at an elevated pressure above normal ambient pressure; and separating the rigid metal layer and the transmissive body;

wherein the dome-shaped surface of the rigid metal layer is a machined surface.

17. The method of claim 1, wherein the transmissive bodies are made of chemically-deposited zinc sulfide.

* * * * *